United States Patent [19]

Merck et al.

[11] 4,430,209
[45] Feb. 7, 1984

[54] METHOD AND APPARATUS FOR ELUTRIATION OF SHOT FROM MINERAL FIBER

[75] Inventors: James Q. Merck, Largo; Leon F. Barry, St. Petersburg, both of Fla.

[73] Assignee: The Celotex Corporation, Tampa, Fla.

[21] Appl. No.: 349,407

[22] Filed: Feb. 16, 1982

[51] Int. Cl.$^3$ ............................................... B03B 7/00
[52] U.S. Cl. ........................................ 209/3; 209/17; 209/159; 209/496; 65/10; 241/20
[58] Field of Search ............... 209/158, 159, 200, 209, 209/494, 495, 496, 2, 3, 17, 18; 162/55, 57, 59, 60, 145, 152; 241/20, 28; 65/10

[56] References Cited

U.S. PATENT DOCUMENTS

| | | | |
|---|---|---|---|
| 1,035,864 | 8/1912 | Dallemagne | 209/157 |
| 1,050,483 | 1/1913 | McCarty | 209/158 |
| 1,865,049 | 6/1932 | Shaver | 162/152 |
| 1,865,167 | 6/1932 | Bongera | 209/157 |
| 1,935,461 | 11/1933 | Unkle et al. | 92/28 |
| 2,255,227 | 9/1941 | Parsons | 83/91 |
| 2,278,092 | 3/1942 | Pearce | 83/91 |
| 2,369,605 | 2/1945 | Powell | 83/91 |
| 2,403,740 | 7/1946 | Muench | 83/91 |
| 2,679,934 | 6/1954 | Remick | 209/159 |
| 2,854,136 | 9/1958 | Gillie et al. | 209/158 |
| 3,025,213 | 3/1962 | Copeland | 162/60 |
| 3,055,498 | 9/1962 | Megumi | 209/2 |
| 3,680,790 | 8/1972 | Galeano | 241/79.1 |
| 3,865,315 | 2/1975 | Roberts et al. | 209/3 |
| 3,984,320 | 10/1976 | Barefoot | 209/495 |
| 4,151,083 | 4/1979 | Dove | 162/55 |
| 4,234,379 | 11/1980 | Conway et al. | 162/145 |
| 4,357,154 | 11/1982 | Hartung | 209/3 |

FOREIGN PATENT DOCUMENTS

| | | |
|---|---|---|
| 815931 | 1/1949 | Fed. Rep. of Germany . |
| 2831403 | 7/1978 | Fed. Rep. of Germany . |
| 401918 | 1/1976 | Sweden . |
| 1537117 | 11/1976 | United Kingdom . |
| 415043 | 10/1974 | U.S.S.R. .................... 209/158 |

Primary Examiner—David L. Lacey
Attorney, Agent, or Firm—James W. Grace; Charles W. Vanecek

[57] ABSTRACT

An elutriation apparatus for de-shotting fibrous material carried in a liquid current comprises a battery of washing vessels located in sequence. A power driven mixing apparatus is provided in the first washing vessel of the sequence for dispersing the fibrous material. The upper section of each washing vessel is divided into two compartments by a baffle, while the vessel's lower section is unobstructed, whereby a current of liquid carrying fibrous material which is introduced into the upper section of the vessel to one side of the baffle travels downwardly and then underneath the baffle and upwardly to the vessel's upper section to the other side of the baffle. The latter upper section is provided with a spout for discharge of the fibrous dispersion from the vessel to the next washing vessel or to the separator apparatus located after the last washing vessel of the sequence for removal of the wash liquid from the de-shotted fibrous material. The bottom of each washing vessel is provided with a discharge apparatus for removal of the shot which settles during the cleaning operation. The elutriation method comprises the steps of (a) continuously flowing the liquid through the vessels, (b) delivering shot-containing fibrous material to the first washing vessel, (c) gently mixing this shot-containing material in the first washing vessel to convert the material into a dispersion of fibrous material and shot, (d) discharging from the washing vessels the shot which settles as the flowing liquid and associated dispersed materials pass through the vessels, and (e) separating the flowing liquid from the de-shotted fibrous material after passage of the flowing liquid and associated de-shotted fibrous material through the washing vessels.

27 Claims, 4 Drawing Figures

METHOD AND APPARATUS FOR ELUTRIATION OF SHOT FROM MINERAL FIBER

BACKGROUND OF THE INVENTION

1. Field of the Invention

The present invention relates generally to an elutriation method and apparatus for de-shotting mineral fiber. More particularly, this invention relates to a battery of elutriation vessels, which are arranged in series one after another, through which an aqueous dispersion of mineral fibers is passed in order to remove from the mineral fibers the shot which is contained therein.

2. Description of the Prior Art

The resistance of asbestos fibers to thermal and chemical attack makes these fibers ideally suited for a wide variety of applications. However, the employment of asbestos fibers in recent years has been significantly curtailed because of health hazards associated with their use in many situations. Accordingly, there is a need to substitute for the asbestos fibers other materials having similar properties. Mineral fibers offer a prime replacement material because of their excellent properties, but they often contain considerable amounts of shot or unfiberized particles, which are highly undesirable in certain uses of the mineral fibers.

Various processes and equipment have been developed for removing the undesirable shot from mineral fiber. Included among the methods of producing "clean," i.e. "shot-free," mineral fiber are fiber washing procedures, such as those disclosed in U.S. Pat. No. 3,055,498 and British Patent Specification No. 1,537,117. Although prior art shot removal processes have met with a measure of success, these systems often suffer from serious drawbacks. Many times they are unduly complex in design and/or equipment. They often are incapable of accomplishing a selective removal of the shot, as, e.g., of the larger size and frequently most troublesome particles. A process with the capability of selectively removing the larger size shot particles is economically attractive since, by leaving smaller unobjectionable shot particles in the mineral fiber, it adds to the total amount of salable product. Furthermore, not only have previous processes commonly failed to satisfactorily remove the entangled shot, but they have also in some cases even brought about a difficultly handleable lumping or sticking together of fibers. Additionally, many known de-shotting procedures unfortunately cause fiber breakage as well as shot removal.

It would be highly desirable if an improved apparatus and method for de-shotting mineral fiber could be found which avoid these and other disadvantages of the prior art, and result in the production of a fiber material which is useful in replacing asbestos, as a filler in fiber glass roofing mat and related products, and the like.

OBJECTS OF THE INVENTION

It is therefore an object of the present invention to provide an improved elutriation apparatus and method, whereby a suspension of inorganic or organic fibrous material in a liquid is transported through a battery of elutriators to remove unfiberized material therefrom.

It is another object of the present invention to provide an elutriation apparatus and method which can function in a continuous flow-through operation for treating inorganic or organic fibrous material to remove unfiberized material therefrom.

It is still another object of the present invention to provide a relatively simple apparatus and method for separating from conventionally produced mineral wool the unfiberized material contained therein at minimum cost and without causing disintegration of the fibrous part of the wool.

It is yet another object of the present invention to provide an elutriation apparatus and method which are highly effective in removing large size shot particles from raw mineral wool, and which thereby convert the mineral wool into a form which is particularly useful in fiber glass roofing mat.

Other objects and advantages of the present invention will become apparent to those skilled in the art when the instant disclosure is read in conjunction with the accompanying drawings.

SUMMARY OF THE INVENTION

The above objects have been achieved in the elutriation apparatus and method of the present invention, wherein a liquid dispersion of fibrous material to be de-shotted is passed through a series of vessels for washing the shot therefrom, and then to an apparatus for separating the cleaned fibers from the liquid dispersing agent. Each washing vessel is preferably a cylindrical tank with an inlet and outlet at its top for the fibrous material to be cleaned and the cleaning liquid and a frusto-conical bottom section, and includes a spout at its top to accommodate the overflow of the fibrous dispersion therefrom in accordance with the present invention. The washing vessels and separator apparatus are advantageously arranged in a descending sequence with the spout of each washing vessel, except the last such vessel in the sequence, located above the inlet of the succeeding vessel so that the wash liquid overflowing from each vessel will discharge directly into the succeeding washing vessel. The spout of the last washing vessel in the series is located over and discharges its spillover into the inlet of the separator apparatus for removal of wash liquid from the fibrous material. The uppermost or first washing vessel in the sequence preferably includes a power driven mixing means positioned therewithin for agitating the wash liquid and fibers and shot entering the vessel.

Each washing vessel is equipped with a baffle means which is mounted therein so as to block the upper section of the vessel to the passage of liquid therethrough and to provide a channel in the vessel's lower section, whereby a current of liquid introduced downwardly into the vessel at a location to one side of the baffle means can flow through the channel and then upwardly and out of the vessel at a location to the other side of the baffle means. As the liquid thus flows through each washing vessel, the fibrous material, being of lower bulk density, is carried along by the current while the non-fibrous material or shot, being of higher bulk density, sinks to the bottom of the vessel and collects there. The bottom of each washing vessel is advantageously provided with a discharge means for removal of the higher bulk density particulate impurities which settle during the cleaning operation.

DESCRIPTION OF THE DRAWINGS

The invention will now be described with reference to the accompanying drawings in which.

DETAILED DESCRIPTION OF THE INVENTION

At the present time mineral wool is prepared by passing a stream of molten material such as slag or molten rock or glass into a rapidly moving stream of hot air or steam. The molten material is thus blown out into fibers which are collected to form the mineral wool. In this process, a large quantity of unfiberized particles, conventionally termed "shot", are formed in the resulting product because of the imperfect drawing out of the molten material into fibers when it is introduced into the gaseous stream. The non-fibrous, particulate material can make up as much as 20-40% of the weight of the mineral wool. The present invention provides a novel means for treating this conventionally produced mineral wool to bring about substantial removal of the non-fibrous shot, beads, and slugs normally found therein.

Figure 1:
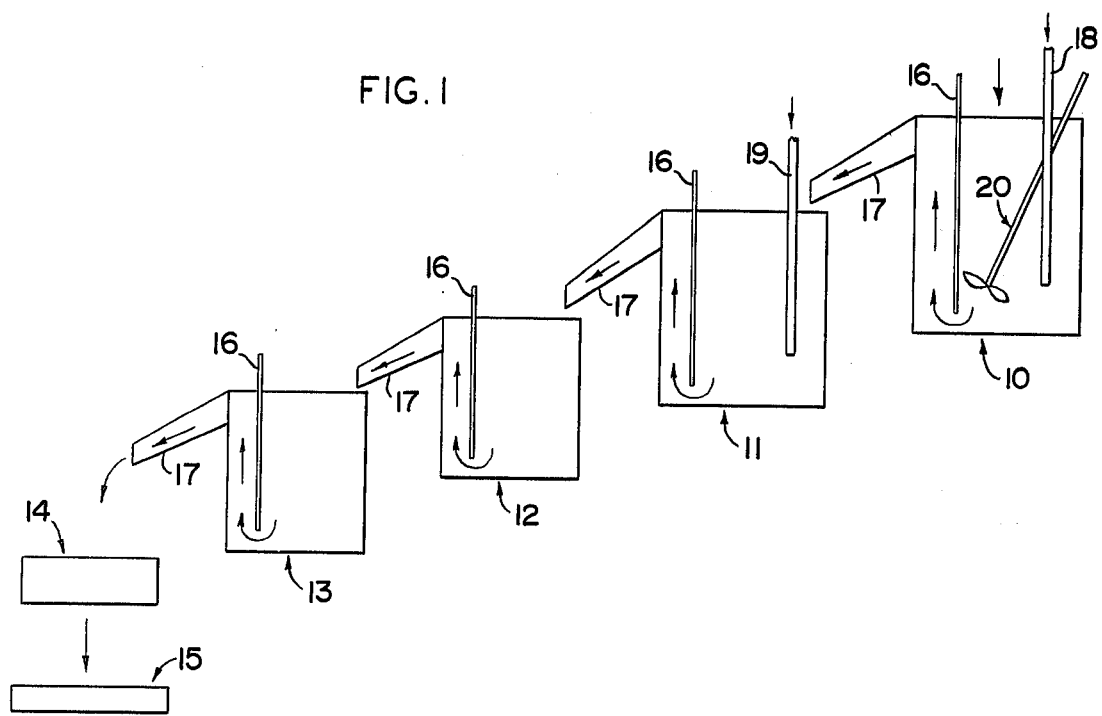
FIG. 1 is a diagrammatic cross-sectional elevation view of a rather rudimentary but operative device embodying the present invention.

Referring now to the drawings, and particularly to FIG. 1, there is shown an elutriation apparatus of the present invention comprising a series of washing vessels 10 through 13. The elutriation system of the invention includes at least 2 washing vessels in the series. Preferably, four or more such vessels are utilized in the washing operation. The rate of production of "clean" mineral wool and the degree of shot removal desired will determine the number and sizes of washing vessels to be utilized. The mineral wool to be cleaned is initially fed to vessel 10 and is thereafter conveyed in turn to each of vessels 11 to 13 to complete the shot removal, with water serving as liquid carrier for the wool. Finally, after leaving vessel 13, the aqueous dispersion of the mineral wool is transported to screen 14, where the wool is collected and the water permitted to run off to drain 15. Various additives, such as wetting agents, can be used in the washing to improve the dispersibility of the mineral wool. While each of the washing vessels in the series can be the same size, the vessel size preferably decreases overall from the largest vessel located at the beginning of the series to the smallest one at the end. Various means can be employed for conveying the dispersed wool from one washing vessel to another and to the collector screen, as e.g. a system of pipes through which the water carrier and dispersed wool are pumped.

A preferred system for conveying the mineral wool through and between the individual washing vessels of the present invention is illustrated in FIG. 1 of the drawings. Each washing vessel of the series, except for the last one, is positioned so that the mineral wool dispersion which discharges from it flows into the succeeding washing vessel of the series. In a similar fashion, the last washing vessel of the series is positioned so that its discharge flows into the screen 14 for separating the mineral wool and water. Because of this arrangement, a stream of water which is caused to flow into vessel 10 will thereafter flow in turn into each of the succeeding washing vessels and eventually through the wool collecting screen 14 into drain 15.

The apparatus of the present invention is especially well adapted for cleaning mineral wool through the use of a continuously flowing carrier liquid. Each of washing vessels 10 through 13 (FIG. 1) is preferably a cylindrically shaped tank and includes openings at its top for the carrier liquid's and mineral wool's entry to and exit from the vessel. Included in each of washing tanks 10 through 13 is a baffle 16 which comprises a wall dividing the upper section of each tank into two compartments. Advantageously, the top of each tank is entirely open except for the baffle traversing it. Both the tanks and baffles may be made of any suitable material, such as rust resisting metal or wood or the like.

Baffle 16 is a rectangularly shaped plate which extends in a generally vertical direction from a position somewhat above the top of the tank to a position within the tank and somewhat above the tank's bottom. In the horizontal direction, baffle plate 16 extends completely across the interior of the tank from a first vertical line located on the tank's curved inner surface to a second vertical line spaced some distance from the first and also located on said curved inner surface. The two vertically extending side edges of plate 16 are welded or otherwise secured to the inside of the tank's wall. Baffle 16 can also be mounted so that its side edges slide freely in channels formed on the inside of the tank's wall, thus providing a means for raising or lowering the baffle and regulating the water current thereunder.

Baffle plate 16 functions like a dam preventing the flow of water across the upper section of the washing vessel. Since the baffle plate terminates some distance above the bottom of the washing vessel, the vessel's lower section below the plate is unobstructed and water can flow freely therethrough. Consequently, a generally U-shaped passage for a current of water is formed inside the washing vessel. The passage extends from the top of the vessel downwardly inside it past one side of the baffle plate and, near the bottom of the vessel, turns around the lower edge of the plate, and then extends upwardly past the other side of the plate to the vessel's top.

As shown in FIG. 1, baffle plated 16 are advantageously spaced from the center of the cylindrical washing tanks, thus forming two differently sized upper compartments in each tank. Each plate can, of course, be positioned closer to or farther from the middle of its tank and lower or higher in the tank than illustrated in FIG. 1. The size of each tank, the baffle plate position within the tanks, and the water current through the tanks are such that the shot containing mineral wool which is treated within the tanks is retained therein for a period of time sufficient for the desired proportion of the non-suspendable shot to settle and accumulate in the tank bottoms. The larger upper compartment of each washing tank is utilized as the receiver for the mineral wool and water carrier in the depelletizing process of the invention, while the mineral wool and water discharge from the tank's smaller upper compartment.

As seen in FIG. 1, the means for conveying the mineral wool dispersion from one treatment vessel to the next in the apparatus of the invention comprises a spout 17 projecting from the smaller upper compartment at the top of each washing tank. Spout or chute 17 is suitably inclined downwardly with its outer end extending some distance over the inlet of the next vessel in the series so that the mineral wool/water dispersion which overflows from the tank and is conveyed through the spout will fall by gravity directly into the inlet of the next vessel. This positioning of each tank spout above the inlet of the next vessel can be achieved in various ways, as, e.g., by locating the vessels of the series at successively lower elevations, as illustrated in FIG. 1; by utilizing vessels characterized by a generally decreasing size and concomitant lower tank spout elevation; or by a combination of these means.

In the operation of the apparatus of the invention, the water carrier is continuously fed into the top of tank 10 by a conduit or pipe 18 which extends downwardly into the larger upper compartment of the tank and terminates some distance within this compartment, as shown in FIG. 1. Another stream of water is similarly fed into the larger upper compartment of tank 11 via pipe 19. The pipe valves (not shown in FIG. 1) which control the water flow rates into the tanks are of conventional design. After a short time, water begins to overflow from tanks 10 and 11 through their respective spouts 17, and then from tanks 12 and 13 through their spouts. The water feed pipes suitably extend a considerable distance below the water level in the washing tanks to prevent splashing and to aid in dispersing the mineral wool. Two power driven mixers 20 (only one shown in FIG. 1) are positioned within tank 10. The shot containing mineral wool is fed into the larger upper compartment of tank 10 and the mixers 20 are utilized to gently agitate the mineral wool and water entering tank 10. Alternatively, one or more than two mixers may be used in tank 10, and one or more such mixers similarly may be used in the succeeding tanks of the series. Advantageously, each mixer is inclined somewhat from the vertical, as illustrated in FIG. 1. The mineral wool becomes dispersed and shot begins to sink to the bottom of tank 10. The water and dispersed mineral wool drawn along by it move through washing tanks 10 to 13 along the path indicated by arrows within these tanks, as shown in FIG. 1. In each washing tank, the dispersed mineral wool is conveyed downwardly past the baffle plate's side which faces on the tank's larger upper compartment, and then under the baffle plate and upwardly past the other side of the plate to the top of the tank's smaller upper compartment, where the mineral wool dispersion overflows through spout 17 and into the next vessel in the series. Although the shot separation and settling out occurs in each of the washing tanks of the series, the greater part of the shot removal and/or removal of the larger shot particles come about early in the process. The mineral wool dispersion exiting from the last washing tank of the series (tank 13 of FIG. 1) falls by gravity onto collector screen 14 which separates the mineral wool from its water carrier. The water is permitted to run off into drain 15. Further drying of the mineral wool is effected in a conventional manner, such as by centrifugation, heating, etc.

Figure 3:
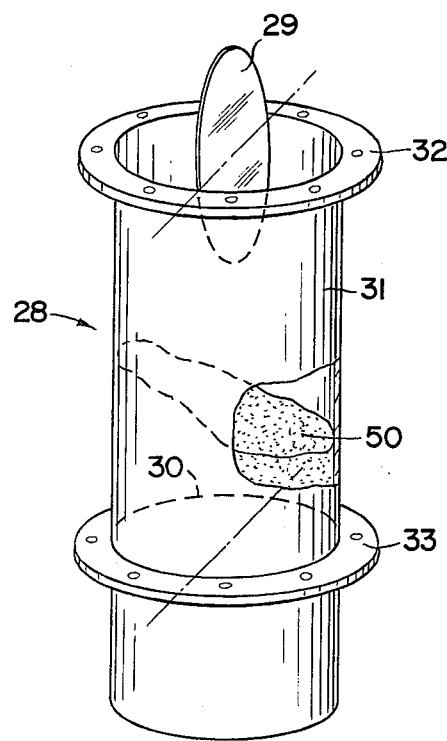
FIG. 3 is a side perspective view, partially broken away, of one of the tank traps of FIG. 2 with accumulated mineral shot.
Figure 4:
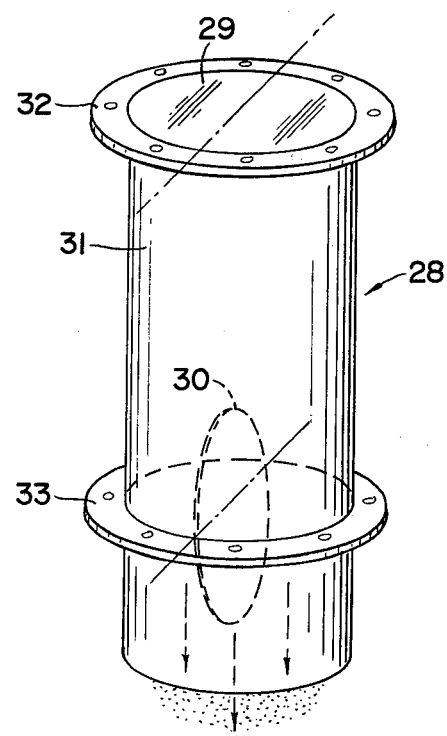
FIG. 4 is a side perspective view, partially broken away, of the tank trap of FIG. 3 with its valves in the shot discharging positions.
Figure 2:
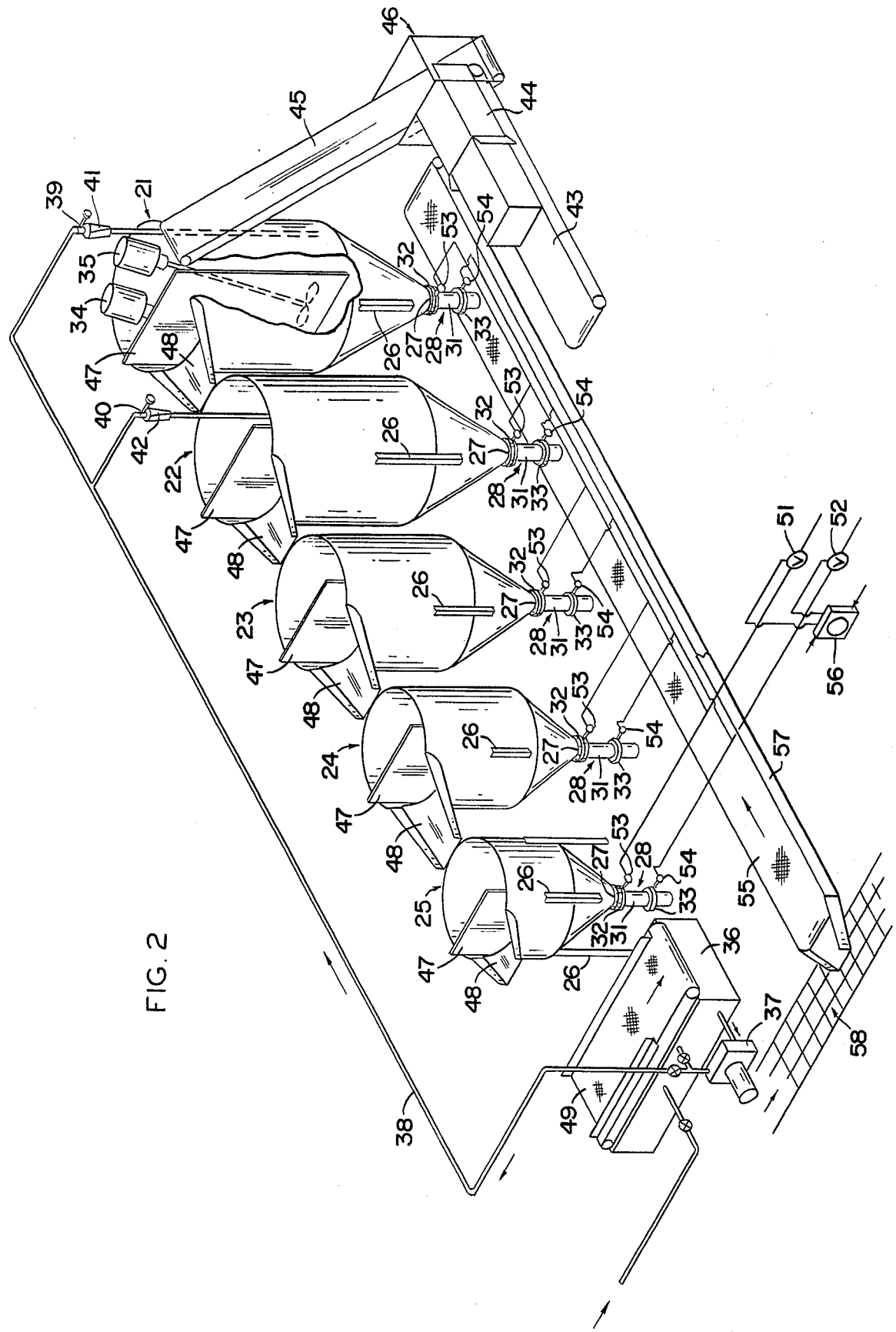
FIG. 2 is a perspective view, partially broken away, of a preferred elutriation apparatus of the present invention.

In the preferred embodiment illustrated in FIG. 2, the elutriation apparatus of the invention comprises a series of 5 washing tanks 21 to 25. Suitable supports 26 (three are shown for tank 25) are provided for the tanks. Each tank is of cylindrical shape and includes a frusto-conically shaped bottom having at its lowest point a shot separation means. A non-suspended shot outlet connection 27 is suitably provided at the lowest point of each tank bottom. A trap 28 comprised of a pair of upper and lower butterfly valves 29 and 30 separated by a length of conduit 31 is connected by flang 32 to the outlet connection 27 of each tank for accumulating non-suspended shot removed from the tank (FIGS. 3 and 4). Conduit 31 extends a short distance below lower butterfly valve 30 and encircling flange 33. Tank 21 includes power driven mixers 34 and 35 positioned therewithin for agitating the water and shot-containing mineral wool entering tank 21 to produce a mineral wool dispersion therein. Mixers 34 and 35 are suitably inclined from the vertical.

As illustrated in FIG. 2, water for use in the process of the invention can be delivered from a municipal water supply to a holding tank 36, from where the water is continuously pumped by the pump 37 through conduit 38, which leads via two branches to tanks 21 and 22. Conduit 38 is provided with valves 39 and 40 and flowmeters 41 and 42 to control and monitor the flow rates into tanks 21 and 22. If desired, a single water stream into tank 21 can be utilized.

Bales of mineral wool to be de-shotted are fed by belt conveyor 43 through a mineral wool bale breaker 44 to an inclined belt conveyor 45, which leads to the top of tank 21 for depositing the debaled mineral wool into the tank. An enclosure 46 is provided around the place where conveyor 43 delivers wool onto converyor 45 to insure the wool's complete transfer to conveyor 45. The mineral wool is fed to tank 21 at a rate proportional to the rate of water addition to the system. In an alternate embodiment, the mineral wool to be cleaned can be put in a dispersed state before its delivery to tank 21.

The top of each of washing tanks 21 to 25 is open except for a baffle plate 47 which divides the upper section of each tank into a larger and a smaller compartment. Baffle plates 47 are constructed and function like baffle plates 16 of tanks 10 to 13. Each baffle 47 blocks the passage of the mineral wool dispersion across the upper section of its tank, but, because the plate does not extend to the tank's bottom, a channel is provided under the plate for the dispersion to pass from one side of the tank to the other. Since the baffle plate in each tank extends some distance above the tank's top, the plate projects above the water level when the tank is full. This prevents the water from flowing over the top of the baffle plate.

A downwardly inclined spout or chute 48 projects from the top edge of the smaller upper compartment of each of tanks 21 to 25. The tanks are arranged so that the chute of each tank, except final tank 25, extends over the inlet of the larger upper compartment of the next tank in the series. Chute 48 of final tank 25 extends over and discharges directly onto 30 mesh wire cloth conveyor belt 49. Water holding tank 36 is advantageously located below the place on belt 49 where the mineral wool dispersion falls to provide a receptacle for the water carrier. This arrangement results in a continuous recycling of water in the process of the invention, with the municipal water supply providing a make-up source of water for the system. The wet de-shotted mineral wool is carried by conveyor 49 to conventional processing facilities wherein the mineral wool is converted to a salable product.

The sizes of washing tanks 21 to 25 are variable. By way of illustration, each of tanks 21 and 22 may have a total capacity of 54.86 gal, with the upper cylidrically shaped section of each having a diameter of 22 inches and a height of 30 inches, and the lower frusto-conically shaped section of each having a height of 22 inches. Tank 23 may have a total capacity of 33.64 gal, with its upper cylindrically shaped section having a diameter of 18⅜ inches and a height of 28 inches, and its lower frusto-conically shaped section having a height of 16 inches. Tank 24 may have a total capacity of 15.18 gal, with its upper cylindrically shaped section having a diameter of 14⅞ inches and a height of 23 inches, and its lower frusto-conically shaped section having a height of 11 inches. Lastly, tank 25 may have a total capacity of 10.33 gal, with its upper cylindrically shaped section having a diameter of 14⅞ inches and a height of 16 inches, and its lower frusto-conically shaped section having a height of 11 inches. The diameters of conduits 31 attached to these size tanks may be 4 inches in the case of tanks 21 to 23 and 3 inches in the case of tanks 24 and 25.

In accordance with the present invention, the dispersed mineral wool is successively washed in each of tanks 21 through 25. The mineral wool dispersion travels from the larger upper compartment of each tank under its baffle plate and then upwardly to the smaller upper compartment, and finally overflows from the tank through chute 48. Each of tanks 21 to 25 is of a size such that the mineral wool dispersion is retained therein for a period of time sufficient for a suitable proportion of the non-suspendable shot entering the tank to settle out of the dispersion.

During the course of the washing operation, the butterfly valves of each tank trap 28 are normally in the positions shown in FIG. 3, i.e. top valve 29 is in the open position and bottom valve 30 is in the closed position. As a result, an accumulation of mineral shot 50 builds up above closed valve 30 in each of traps 28 (FIG. 3). This shot accumulation is periodically removed from tank traps 28 by the action of air valves 51 and 52, which operate each of solenoid devices 53 and 54, respectively, to close the upper valves 29 and then open the lower valves 30, whereby the shot 50 within the traps 28 is dumped onto shot conveyor 55. One tank trap 28 with its valves in the shot discharging positions is shown in FIG. 4. After the shot discharge, the lower valves 30 are closed and the upper valves 29 are then opened for the further accumulation of mineral shot in tank traps 28. A timer 56 is provided to automate the shot discharge onto conveyor 55. Shot conveyor 55 is advantageously a 30 mesh wire cloth belt. The accumulated shot is removed by conveyor belt 55 in the direction indicated by the arrow in FIG. 2, while the water discharged with it falls through the belt into inclined drain 57 which runs under all of discharge traps 28 for conveyance of the discharged water into drainage ditch 58.

The invention is further illustrated by the following example:

EXAMPLE

The operation of the mineral wool depelletizing apparatus of the invention can be illustrated with reference to FIG. 1 of the drawings. The apparatus includes a battery of four elutriators, viz. tanks 10, 11, 12 and 13 having capacities of 42.7 gal, 25.2 gal, 7.7 gal and 7.7 gal, respectively. A water current through the four elutriators is established as follows. Water from a municipal water supply is continuously conducted to tanks 10 and 11 through 1 inch diameter feed pipes 18 and 19, respectively. By regulating the valves of each pipe, the flow rates of the water into the tanks are set at 14.29 gal/min into tank 10, and 18.75 gal/min into tank 11. The two tanks become filled with water at the indicated rates and the water then cascades over into tank 12 and finally into tank 13. The water coming from tank 13 passes through 30-mesh screen 14 and into drain 15.

The "dirty" mineral wool, i.e. wool containing unfiberized particles, is fed into tank 10 at a position to the right of baffle plate 16, as shown by the arrow at the top of tank 10. The mineral wool is added at the rate of 1.5 lb/min to tank 10, where two power driven "Lightnin" mixers 20 (only one shown in FIG. 1) positioned within the tank agitate the water and mineral wool composition with a minimum of shear. The entangled wool is thereby dispersed, and, in addition, all the largest shot particles and some smaller, more loosely held pieces of shot settle to the bottom of tank 10 and are thus removed from the wool. The dispersed wool travels under baffle plate 16 and over spout 17 into tank 11 where the wool entanglement is further reduced, allowing more shot to drop out. The wool again passes under a baffle plate, and then through the tank'spout and into tank 12. The mineral wool/water dispersion, whose consistency becomes slightly reduced in tanks 12 and 13, is transported through these two tanks in the same manner as through tank 11. The aqueous dispersion flows out of tanks 12 and 13 at the rate of approximately 34 gal/min. The wool coming out of tank 13 flows into the 30-mesh collector screen 14 where the free water drains off leaving wet wool which has a 85–90% moisture content. This wet wool is centrifuged to reduce the moisture to 25%, and the wool is thereafter dried.

After de-shotting about 25 lb of dry in-feed mineral wool in accordance with the above-described elutriation process, it is necessary to remove the deposited shot from the elutriators before proceeding with the wool cleaning operation. If more than 25 lb of wool is fed into the system, a point is reached when shot is actually washed into the wool.

Mineral wool cleaned in accordance with the above elutriation method was found to be free from the large size shot particles which are highly detrimental in roofing mat applications. The fine particle size shot which remained in the wool proved to be no obstacle to the wool's utilization as a filler in fiber glass roofing mat. The "clean" mineral wool also was used as a replacement for asbestos in a mineral fiber felt used in built up roofing applications.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:
1. An apparatus for de-shotting shot-containing mineral wool comprising:
 (a) a battery of washing vessels located in sequence, each of said washing vessels having (i) baffle means positioned therewithin for blocking the upper section of said washing vessel to the passage thereacross of a flowing liquid while leaving the lower section of said washing vessel open to the passage thereacross of said liquid so that said upper section of each washing vessel is divided into a receiving compartment for receiving a flowing liquid and a discharge compartment into which said liquid flows after passing underneath said baffle means, and (ii) discharge means positioned at the lowest point of said lower section for discharging non- fibrous material which settles in said washing vessel,
(b) liquid delivery means for continuously introducing a flowing liquid into the receiving compartment of the first washing vessel of said battery to one side of said vessel's baffle means,
(c) means for delivering shot-containing mineral wool to said receiving compartment of the first washing vessel,
(d) means for gently mixing said shot-containing mineral wool in said receiving compartment of the first washing vessel to convert said shot-containing mineral wool into a dispersion of fibrous and non-fibrous materials in said flowing liquid,
(e) a device located in sequence after the last washing vessel of said battery for separating said flowing liquid from the de-shotted fibrous material, and
(f) flow connection means positioned and arranged with respect to said discharge compartment of each of the washing vessels for conveying said flowing liquid and associated dispersed materials to the receiving compartment of the next washing vessel of the sequence or, in the case of said last washing vessel of the battery, to said device for separating said flowing liquid from said de-shotted fibrous material, whereby flowing liquid introduced into said receiving compartment of the upper section of each of said washing vessels to one side of said vessel's baffle means flows downwardly and then under said baffle means and upwardly to said vessel's discharge compartment to the other side of said baffle means, a separation being thereby effected between the fibrous material which is conveyed along by said flowing liquid and the non-fibrous material which settles at the bottom of said vessel, said non-fibrous material being discharged from said vessel by said discharge means.

2. The apparatus of claim 1 wherein each of said washing vessels comprises a tank having an upright cylindrically shaped upper section and a frusto-conically shaped lower section which tapers in the downward direction away from said upper section, said frusto-conically shaped lower section having at its lowest point said discharge means for discharging the non-fibrous material which settles in said tank.

3. The apparatus of claim 2 wherein each of the baffle means comprises a rectangularly shaped plate extending completely across the interior of said tank upper section above said frusto-conically shaped lower section, said plate being positioned so that the receiving compartment is larger than the discharge compartment.

4. The apparatus of claim 3 wherein the flow connection means comprises a downwardly inclined chute projecting from the top edge of said discharge compartment of each of the tanks, and said tanks are arranged so that the chute of each tank, except the last tank of the battery, extends over and discharges directly into said receiving compartment of the next tank in the sequence, and the chute of said last tank extends over and discharges directly onto the device for separating the flowing liquid from the de-shotted fibrous material.

5. The apparatus of claim 4 wherein said device for separating the flowing liquid from the de-shotted fibrous material comprises a screen for collecting said fibrous material while permitting said flowing liquid to pass therethrough.

6. The apparatus of claim 4 which includes means for recirculating said separated flowing liquid through said battery of washing tanks.

7. The apparatus of claim 4 wherein each of the frusto-conically shaped lower sections has at its lowest point an outlet port through which said lower section communicates with a conduit connected to and extending downwardly from said lower section, a first valve being positioned at said outlet port to open and close said port and a second valve being spaced from said first valve and mounted within said conduit to open and close said conduit to the passage of non-fibrous material therethrough, wherein said first valve is maintained in the open position and said second valve in the closed position to accumulate non-fibrous material which settles in said tank, and said first valve is closed and said second valve opened to discharge said accumulated non-fibrous material from said conduit.

8. The apparatus of claim 7 which includes means for automatically opening and closing said first and second valves for accumulating said non-fibrous material in the conduits and discharging said accumulated non-fibrous material therefrom.

9. The apparatus of claims 4 or 7 wherein the means for gently mixing the shot-containing mineral wool to convert said shot-containing mineral wool into a dispersion of fibrous and non-fibrous materials comprises a pair of inclined power driven mixers mounted within the receiving compartment of the first tank of the battery.

10. The apparatus of claim 9 wherein the liquid delivery means for continuously introducing a flowing liquid into the receiving compartment of the first washing vessel comprises a pipe extending downwardly into said receiving compartment, and an additional pipe extends downwardly into the receiving compartment of the second tank of said battery for the continuous introduction of flowing liquid into said second tank.

11. The apparatus of claim 7 wherein the battery comprises at least four tanks of successively smaller size.

12. The apparatus of claim 11 which includes:
(a) means for recirculating the separated flowing liquid through said battery of washing tanks, and
(b) means for automatically opening and closing the first and second valves associated with each washing tank conduit for accumulating the non-fibrous material in said conduit and discharging said accumulated non-fibrous material therefrom.

13. The apparatus of claim 12 wherein:
(a) the liquid delivery means for continuously introducing a flowing liquid into the receiving compartment of the first washing vessel comprises a pipe extending downwardly into said receiving compartment, and an additional pipe extends downwardly into the receiving compartment of the second tank of said battery for the continuous introduction of flowing liquid into said second tank, and
(b) the means for gently mixing the shot-containing mineral wool to convert said shot-containing mineral wool into the dispersion of fibrous and non-fibrous materials comprises a pair of inclined power driven mixers mounted within the receiving compartment of said first tank of the battery.

14. A method of de-shotting shot-continuing mineral wool comprising the steps of:
(a) continuously flowing a liquid through a battery of washing vessels located in sequence, each of said washing vessels having baffle means positioned therewithin for blocking the upper section of said washing vessel to the passage thereacross of said flowing liquid while leaving the lower section of said washing vessel open to the passage thereacross of said liquid so that said upper section of each washing vessel is divided into a receiving compartment for receiving said flowing liquid and a discharge compartment into which said liquid flows after passing underneath said baffle means, said flowing liquid being introduced into said receiving compartment of each washing vessel, (b) delivering shot-containing mineral wool to the receiving compartment of the first washing vessel of said battery, (c) gently mixing said shot-containing mineral wool in said receiving compartment of the first washing vessel to convert said shot-containing mineral wool into a dispersion of fibrous and non-fibrous materials in said flowing liquid, whereby said flowing liquid and associated dispersed materials introduced into the receiving compartment of each of said washing vessels to one side of said vessel's baffle means flow downwardly and then under said baffle means and upwardly to said vessel's discharge compartment to the other side of said baffle means, a separation being thereby effected between the fibrous material which is conveyed along by said flowing liquid and the non-fibrous material which settles at the bottom of said vessel, (d) discharging said settled non-fibrous material from said washing vessels, and (e) separating, after passage of said flowing liquid and associated de-shotted fibrous material through said battery of washing vessels, said flowing liquid from said de-shotted fibrous material, wherein each of said washing vessels has flow connection means asociated with said discharge compartment of said vessel for conveying said flowing liquid and associated dispersed materials to the next separation step of the sequence.

15. The method of claim 14 wherein each of said washing vessels comprises a tank having an upright cylindrically shaped upper section and a frusto-conically shaped lower section which tapers in the downward direction away from said upper section, said frusto-conically shaped lower section having at its lowest point a discharge means for discharging the non-fibrous material which settles in said tank.

16. The method of claim 15 wherein each of the baffle means comprises a rectangularly shaped plate extending completely across the interior of said tank upper section above said frusto-conically shaped lower section, said plate being positioned so that the receiving compartment is larger than the discharge compartment.

17. The method of claim 16 wherein the flow connection means comprises a downwardly inclined chute projecting from the top edge of said discharge compartment of each of the tanks, and said tanks are arranged so that the chute of each tank, except the last tank of the battery, extends over and discharges directly into said receiving compartment of the next tank in the sequence, and the chute of said last tank extends over and discharges directly onto a device for separating the flowing liquid from the de-shotted fibrous material.

18. The method of claim 17 werein said device for separating the flowing liquid from the de-shotted fibrous material comprises a screen for collecting said fibrous material while permitting said flowing liquid to pass therethrough.

19. The method of claim 17 which includes the step of recirculating said separated flowing liquid through said battery of washing tanks.

20. The method of claim 17 wherein each of the frusto-conically shaped lower sections has at its lowest point an outlet port through which said lower section communicates with a conduit connected to and extending downwardly from said lower section, a first valve being positioned at said outlet port to open and close said port and a second valve being spaced from said first valve and mounted within said conduit to open and close said conduit to the passage of non-fibrous material therethrough, wherein said first valve is maintained in the open position and said second valve in the closed position to accumulate non-fibrous material which settles in said tank, and said first valve is closed and said second valve opened to discharge said accumulated non-fibrous material from said conduit.

21. The method of claim 20 wherein said first and second valves are automatically opened and closed for accumulating said non-fibrous material in the conduits and discharging said accumulated non-fibrous material therefrom.

22. The method of claims 17 or 20 wherein the shot-containing mineral wool is converted into the dispersion of fibrous and non-fibrous materials by a pair of inclined power driven mixers mounted within the receiving compartment of the first tank of the battery.

23. The method of claim 22 wherein flowing liquid is continuously introduced into each of the first and second tanks of said battery through a pipe extending downwardly into the receiving compartment of each of said tanks.

24. The method of claim 20 wherein the battery comprises at least four tanks of successively smaller size.

25. The method of claim 24 which includes the step of recirculating the separated flowing liquid through said battery of washing tanks.

26. The method of claim 25 wherein the first and second valves associated with each washing tank conduit are automatically opened and closed for accumulating the non-fibrous material in said conduit and discharging said accumulated non-fibrous material therefrom.

27. The method of claim 26 wherein:
(a) said flowing liquid is continuously introduced into each of the first and second tanks of the battery through a pipe extending downwardly into the receiving compartment of each of said tanks, and
(b) the shot-containing mineral wool is converted into the dispersion of fibrous and non-fibrous materials by a pair of inclined power driven mixers mounted within the receiving compartment of said first tank of the battery.

* * * * *